Figure 1:
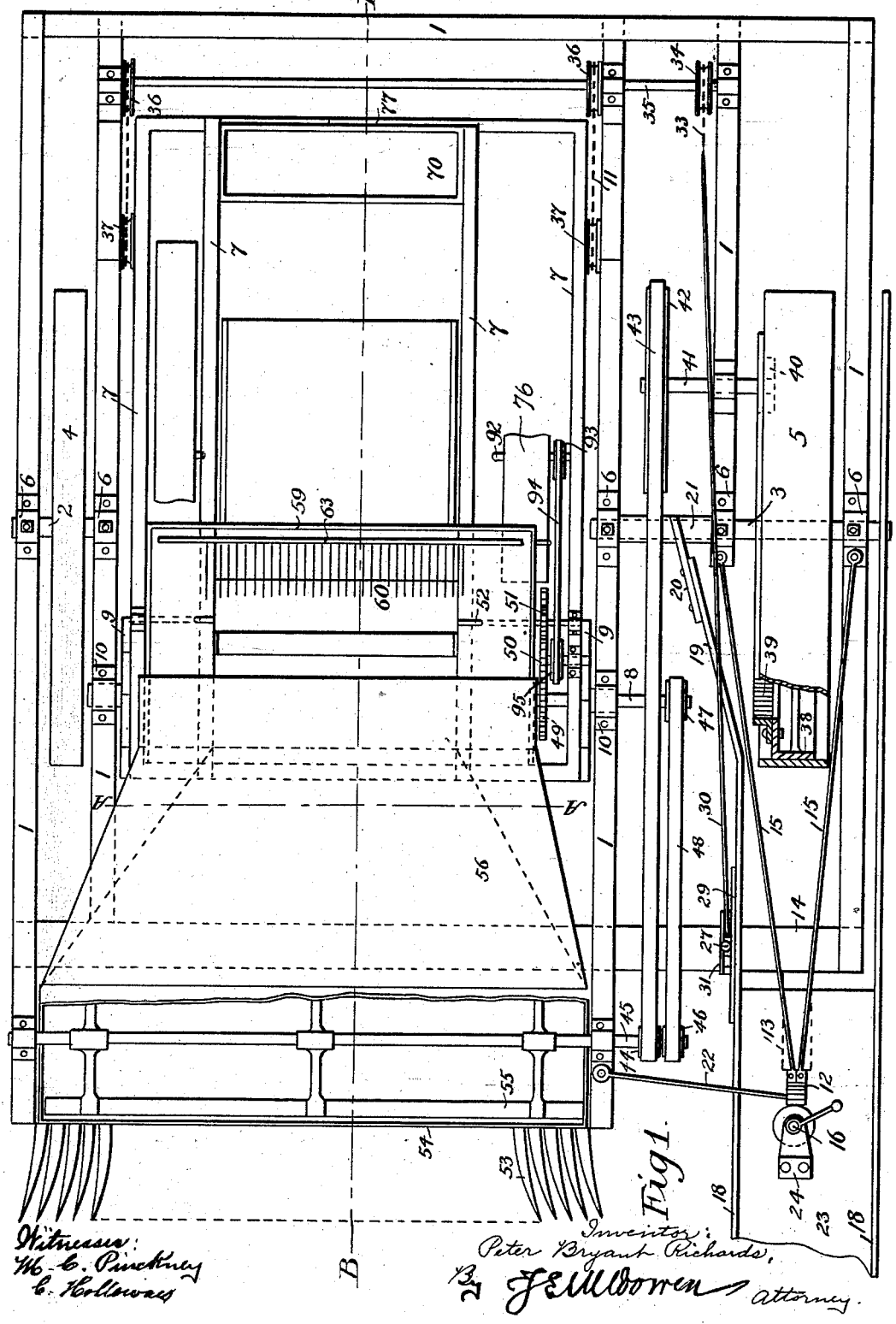

No. 717,925. PATENTED JAN. 6, 1903.
P. B. RICHARDS.
HARVESTING MACHINE.
APPLICATION FILED JULY 6, 1900.
NO MODEL. 3 SHEETS—SHEET 1.

Witnesses:
M. C. Pinckney
C. Holloway

Inventor:
Peter Bryant Richards,
By J.E.M. Dowen Attorney.

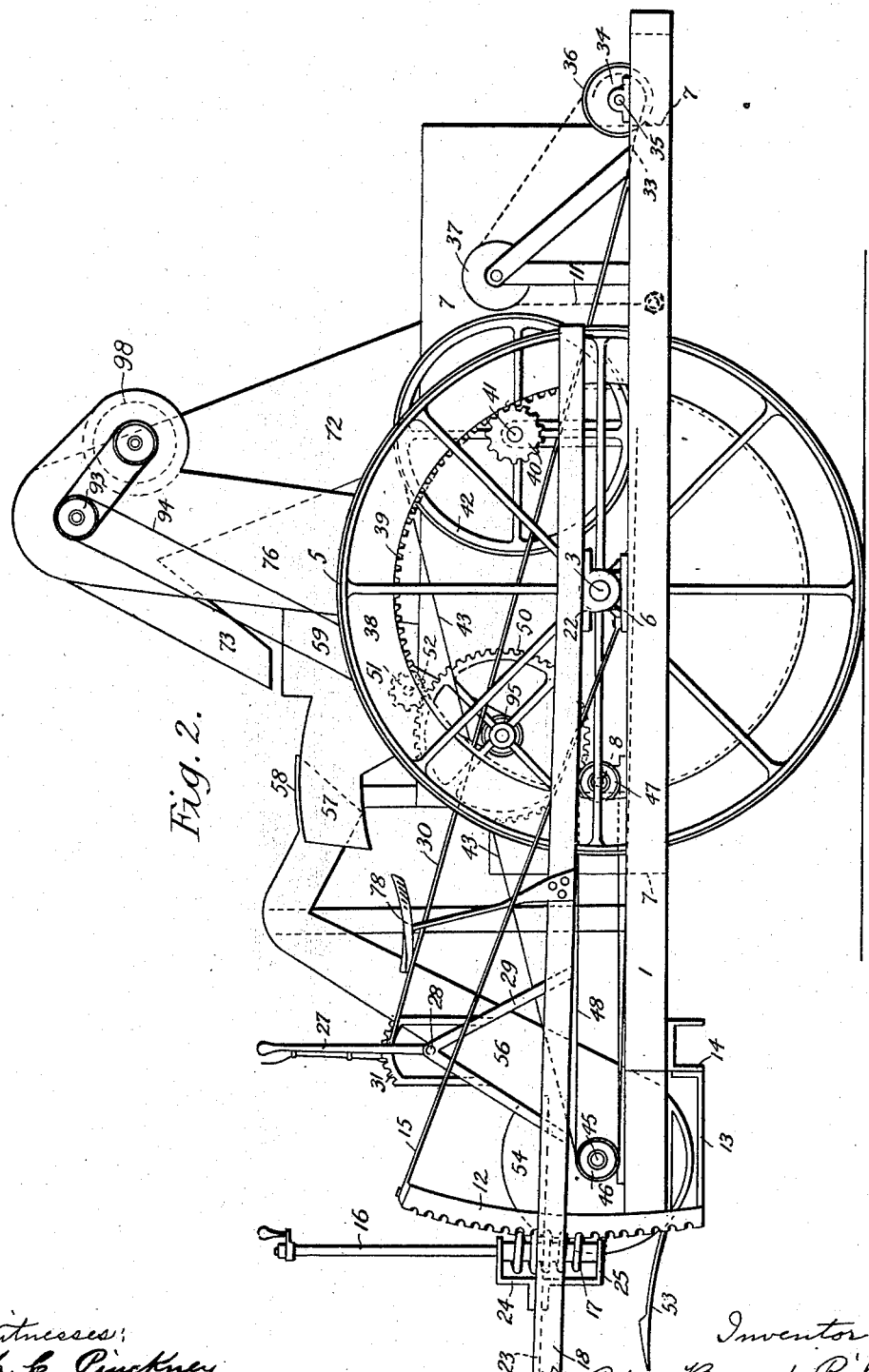

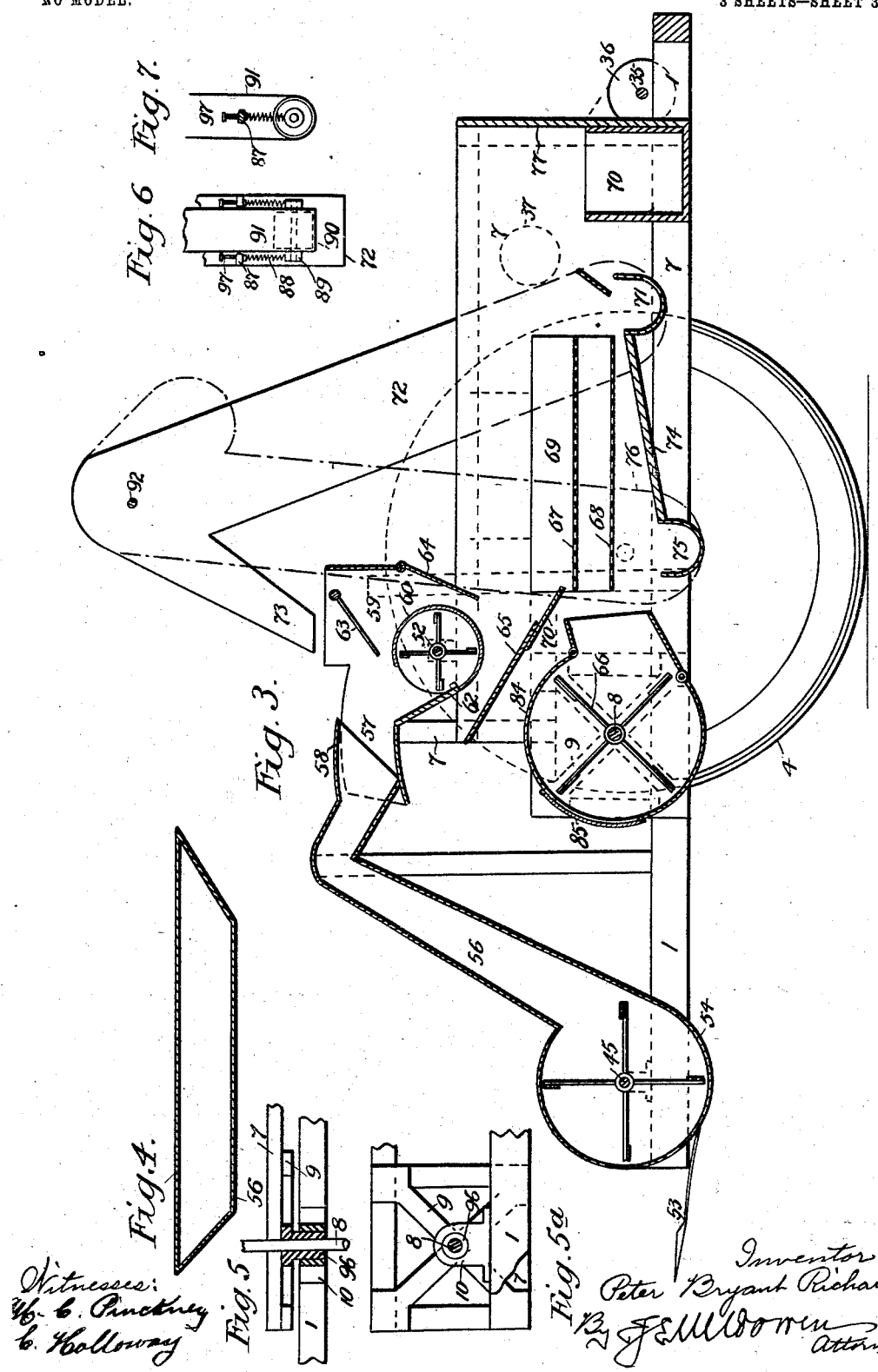

UNITED STATES PATENT OFFICE.

PETER BRYANT RICHARDS, OF NATHALIA, VICTORIA, AUSTRALIA.

HARVESTING-MACHINE.

SPECIFICATION forming part of Letters Patent No. 717,925, dated January 6, 1903.

Application filed July 6, 1900. Serial No. 22,699. (No model.)

*To all whom it may concern:*

Be it known that I, PETER BRYANT RICHARDS, a subject of the Queen of Great Britain, residing on Main street, Nathalia, Victoria, Australia, have invented certain new and useful Improvements in Harvesting-Machines, of which the following is a specification.

This invention relates to pivoting the frame of the harvester on independent shafts at either side of the machine, and which shafts form the axles of the supporting-wheels of the machine. I thus employ two short axles in line and obtain a free central space for the winnowing mechanism of the harvester. The winnower-frame is centered on a shaft supported by the main frame and has gearing connected with it and with the main frame to maintain it in a horizontal position when working and when adjusting the main frame carrying the stripper-comb, &c., at different angles. By constructing the machine in this manner I am able to considerably simplify the arrangement of parts and the gearing necessary to actuate the moving parts of the machine.

The improvements may be applied either to stripper-and-winnower harvesters, as hereinafter described, or to cutter-and-thresher harvesters.

In order that the invention may be made clear, I will refer in its description to the accompanying sheets of drawings, in which—

Figure 1 is a plan showing the improvements; Fig. 2 is a side elevation of the same; Fig. 3, a vertical section taken on line B B of Fig. 1. Fig. 4 is a section of the chute, taken on line A A of Fig. 1. Fig. 5 is a horizontal section showing the connection of winnower-frame with the main frame. Fig. 5ᵃ is an elevation of the same. Figs. 6 and 7 show two views of the means employed for keeping the elevating-belts tight in the elevator.

In the drawings, 1 represents the main frame of the machine, which has on either side shafts 2 3, fixed to the frame, and which form axles for the supporting-wheels 4 5. The latter are arranged to run loosely upon the said axles. The frame 1 is connected by suitable straps 6 6 with the said axles.

7 represents the winnower-frame, which is set within the main frame 1, (between the axles 2 3.) The winnower-frame is connected to main frame by means of shaft 8, which has its bearing in boss 96 of X-frame 9, (see Figs. 5 and 5ᵃ,) which said boss in turn bears in blocks 10, mounted on main frame. The X-frame has its arms secured to the winnower-frame. The shaft 8 is set near one end of the winnower-frame, which is thus free to move upon this shaft, its other end being supported by the chain 11, to be hereinafter described.

12 represents a curved rack-bar, which is secured at its bottom to the main frame by means of arm 13, bolted to angle-plate 14, attached to under side of frame 1. The top of the rack-bar is connected by long rods 15 to the frame near its connection with axle 3 and by stay-rod 22.

16 represents the usual worm-rod, provided with handle and worm 17 for actuating the rack 12.

18 represents long plates or "straps" which are supported by the axle 3 in any convenient manner. I have shown one of the straps with bent portion 19, secured to lug 20, Fig. 1, on sleeve 21 of axle 3, the other strap being secured by an inverted bearing-block 22, Fig. 2. The straps 18 are arranged at either side of the supporting-wheel 5, and the forward portions are united by plate 23, which forms a platform. The said plate 23 supports bent plates 24 25, which form bearings for the worm-rod 16.

27 represents a lever having its fulcrum at 28 in the angle-plate 29, which is supported by one of the frame-plates 18. This lever has attached a long rod 30. A rack 31 is connected with the angle-piece 29. The lever is provided with spring-pawl, which is arranged to engage with rack. The rod 30 has chain 33 attached to its free end, which chain is secured to pulley 34, having its bearing near end of the main frame. The spindle 35 of this pulley has near its opposite ends pulleys 36. The chain 11, before referred to, passes over and is secured to this pulley 36 and over a pulley 37, supported from the main frame, and passes down and is secured to the winnower-frame 7.

The main wheel 5 has an L-plate 38 secured on the inside of its rim, and to which is secured the rack 39.

40 represents a pinion driven by said rack. The spindle 41 of this pinion is supported from the frame 1 and carries pulley-wheel 42, and a belt 43 connects said pulley with small pulley 44 on main thresher-spindle 45. The spindle 45 carries also pulley 46, which has belt connection with pulley 47 on spindle 8. On this spindle also is mounted a pinion at 49, Fig. 1, which gears with toothed wheel 50, which in turn gears with pinion 51 on secondary thresher or peg-drum spindle 52.

53 represents the stripper-comb, which is secured to the thresher-drum 54 in the usual manner. The spindle 45 of the thresher is provided with the usual beaters 55, which throw the material up the chute 56. This chute is constructed of the sectional form shown on Fig. 4, with inclined sides and wider on the upper face.

57 represents an extension portion of the hopper 59, and which is supported from the winnower-frame and is arranged to receive the material from the outlet 58 of the chute 56. The relative positions of the outlet 58 and the extension 57 varying with different adjustments of the machine, the discharge will always be into the hopper.

60 represents the peg-drum, which is set in the hopper and having its spindle-bearing in the winnower-frame.

63 is the adjustable rake set in the hopper, and which allows the free grain to pass through and away from the peg-drum while the headings, &c., are carried to the drum.

62 is the concave of peg-drum.

64 is a hinged extension-piece of hopper, which is adjusted by any suitable means. The material from the hopper and peg-drum fall onto the inclined plate 65, which has adjustable extension-piece 70. This extension is adjusted so that its projection beyond plate 65 may be varied. The material by this means is directed onto the riddles.

67 and 68 represent the screens to the riddle-box 69, and 66 the fan, which is mounted on spindle 8. The draft from this fan is directed onto the under side of the screens. The dust and chaff are thus blown into box 70, provided for the purpose, while the tailings too coarse to pass through the screens will fall into the channel 71, which will conduct them to the tailings-elevator 72, (which is provided with the usual belt and buckets,) and from which they will pass by chute 73 back to the hopper 59. The grain, which will pass through the screens 67 and 68, will pass by the inclined bottom plate 74 of the tailings-box into the channel 75, which will convey it to the grain-elevator 76, where it will finally pass through rotating screen 98 prior to being bagged. The back of the winnower-frame is closed in with doors 77.

78 represents the driver's seat. Motion is given to the riddle-boxes in the usual manner, and preferably from a crank-pin set in the wheel 50.

The casing 84 of the fan is provided with a hinged door 85, or doors, the object of same being to regulate to some extent the draft from the fan, so that when the machine is doing light work and traveling fast and the fan is traveling at a greater speed than is desirable one or more of these doors will be automatically blown open on its hinge, so allowing an escape and reducing the force of the draft on the riddles.

I provide an appliance (see Figs. 6 and 7) for keeping the belting of the elevators tight. This consists of studs 87, secured to the sides of the elevator, and springs 88, which are connected with adjusting-screws 97 and to bearing-blocks 89 for the axle of pulley 90. One of these devices is attached near the bottom of each elevator and maintains a constant tension on the belt. The pressure of the pulley 90 on belt can be adjusted by screw-pin 97. The elevators are arranged to lean toward each other, and a single through-spindle is employed to operate the elevating-belts 91, Figs. 6 and 7, which carry the usual buckets.

93 is pulley on spindle 92; 94, belt for same, which connects with pulley 95 on spindle of toothed wheel 50.

The *modus operandi* is as follows: The worm-rod 16 is turned by the driver to raise or lower the main frame, so as to adjust the level of the stripper-comb, the frame being thus turned upon its central pivot—i. e., the axle of the wheel 5. Assume that comb end of the frame be lowered. The back end of the frame will rise correspondingly, so causing a slack in the chain 11, which is connected to the winnower-frame, and this slack will be taken up by the pulley 36, so as to maintain the winnower-frame at a constant level. The winnower-frame may be brought into a level position when it becomes inclined in descending or ascending a hill by operating the lever 27, which acts upon the pulley 34 to turn the shaft 35, upon which the pulley 36 is mounted. In the progress of the machine the rack 39 of the wheel 5 will rotate the pinion 40 to turn the shaft 41, and the pulley-wheel 42 thereon thereby gives motion to the thresher-drum through the medium of belt 43 and pulley 44. Motion is communicated from the thresher-shaft 45 to the fan 66 by pulleys 46 and 47 and their connecting-belt 48. Motion is communicated from the fan-spindle 8 to the peg-drum spindle 52 by means of pinion-wheel on fan-spindle, pinion-wheel on peg-drum spindle, and the intermediate toothed wheel 50, gearing with same.

The drawings appended illustrate my invention as applied to a harvester; but some details of construction of the harvester are omitted, as they are well known and form no part of my invention.

Having now particularly described and ascertained the nature of my said invention and in what manner the same is to be performed, I declare that what I claim is—

1. In harvesting-machines, in combination, a main frame supported at either side on wheels having independent axles, said frame being free to swing upon said axles, a stripper-comb, thresher-drum and chute supported by main frame, frames 9 having hollow bosses set in bearings on the main frame, a winnower-frame 7 set within main frame and supported near one end by frames 9, a chain attachment at the other end, pulleys connected with main frame to carry chain, a lever to which chain is connected and whereby a pull or releasing of the chain is obtainable and whereby the chain can be fixed to adjust the level of the winnower-frame, means for actuating thresher-shaft 45 from wheel 5, a shaft 8 bearing in hollow boss of frame 9 to actuate the winnower mechanism, and means for actuating shaft 8 from the shaft 45, substantially as and for the purposes described.

2. In harvesting-machines, in combination, a main frame 1 supported at either side from independent axles 2, 3 of wheels 4, 5, a stripper-comb, thresher-drum and chute carried by said frame, long plates or straps 18 supported by the axle 3 and arranged at either side of the supporting-wheel 5 and united at the forward portion by a plate 23, a worm 17 supported from said plate 23 and a rack 12 supported from the frame 1 whereby the angle of the said frame and level of stripper-comb is adjusted, a winnower-frame 7 set within main frame, frames 9 supporting the winnower-frame near one end and having hollow bosses bearing on main frame, means connected with the other end for bringing the winnower-frame into a level position when it becomes inclined in descending or ascending a hill, and means for maintaining it in the level position, a hopper with extension 57 arranged to move with the winnower-frame so as to receive the material from the outlet under all the different adjustments of the machine, substantially as and for the purposes described.

3. In harvesting-machines, in combination, a main frame 1 supported at either side from independent axles 2, 3 of wheels 4, 5, such frame carrying stripper-comb, thresher-drum and chute, long plates or straps 18 supported by the axle 3 and arranged at either side of the supporting-wheel 5 and united at the forward portion by a plate 23, a worm 17 supported from said plate 23, and a rack 12 supported from the frame 1, whereby the angle of the said frame and level of stripper-comb is adjusted, a winnower-frame 7 set within main frame, frames 9 supporting the winnower-frame near one end with hollow bosses having bearings from main frame, chains 11 attached near other end and passing over pulleys 37 supported from main frame, and connected with pulleys 36 on shaft 35 having bearings in main frame and carrying pulley 34, the latter having chain-and-rod connection, such rod being connected to pivoted lever 27 supported from main framing and provided with spring pawl and rack for fixing it, a hopper with extension 57 arranged to turn with the winnower-frame so as to receive the material from the outlet under all the different adjustments of the machine, a rack on the wheel 5, a pinion 40 on shaft 41 bearing on frame 1, a pulley 42 on shaft 41, a pulley 44 on shaft 45 of thresher, a belt connection between the pulleys for actuating the thresher, a pulley 46 on thresher-shaft 45, a pulley 47 on shaft 8, bearing in hollow boss 96 of frame 9, a belt connection between the pulleys 46 and 47, a spur-wheel on the shaft 8, and means for actuating the winnowing mechanism therefrom, substantially as and for the purposes described.

In testimony whereof I have signed my name to this specification in the presence of two subscribing witnesses.

PETER BRYANT RICHARDS.

Witnesses:
A. O. SACHSE,
A. HARKER.